United States Patent
Chen et al.

(10) Patent No.: US 8,064,208 B2
(45) Date of Patent: Nov. 22, 2011

(54) MOUNTING APPARATUS FOR DATA STORAGE DEVICE

(75) Inventors: Xiao-Zhu Chen, Shenzhen (CN); Lei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 103 days.

(21) Appl. No.: 12/755,431

(22) Filed: Apr. 7, 2010

(65) Prior Publication Data

US 2011/0227465 A1    Sep. 22, 2011

(30) Foreign Application Priority Data

Mar. 17, 2010    (CN) .......................... 2010 1 0125778

(51) Int. Cl.
*H05K 7/12*    (2006.01)

(52) U.S. Cl. .................. 361/747; 361/679.37; 361/740; 361/807

(58) Field of Classification Search ............. 361/679.32, 361/679.33, 679.37, 679.38, 726, 732, 740, 361/747, 801, 807, 809; 312/223.2
See application file for complete search history.

(56) References Cited

U.S. PATENT DOCUMENTS

| | | | |
|---|---|---|---|
| 6,359,836 B1 * | 3/2002 | Sevier et al. .................. | 361/725 |
| 7,021,948 B2 * | 4/2006 | Lin .............................. | 439/159 |
| 7,535,704 B2 * | 5/2009 | Olesiewicz et al. ...... | 361/679.37 |
| 7,561,441 B1 * | 7/2009 | Chang .......................... | 361/801 |
| 7,580,253 B1 * | 8/2009 | Chen et al. ............... | 361/679.33 |
| 7,681,210 B2 * | 3/2010 | Jiang et al. .................... | 720/638 |
| 7,974,089 B2 * | 7/2011 | Dai ......................... | 361/679.37 |
| 7,983,033 B2 * | 7/2011 | Antonuccio et al. ...... | 361/679.34 |
| 8,023,259 B2 * | 9/2011 | Lam et al. ................ | 361/679.37 |
| 2008/0089022 A1 * | 4/2008 | Cheung et al. ................. | 361/685 |

* cited by examiner

*Primary Examiner* — Dameon Levi
(74) *Attorney, Agent, or Firm* — Altis Law Group, Inc.

(57) ABSTRACT

A mounting apparatus for a data storage device can prevent a bracket without data storage device from being placed in a computer enclosure. When the data storage device is not mounted in a bracket, a first end of a baffle extends into the bracket, a second end of the baffle extends out of the bracket under torque of a torsion spring. When the data storage device is mounted in the bracket, the data storage device drives the baffle to receive in the bracket.

7 Claims, 6 Drawing Sheets

MOUNTING APPARATUS FOR DATA STORAGE DEVICE

BACKGROUND

1. Technical Field

The present disclosure relates to a mounting apparatus for data storage devices.

2. Description of Related Art

A bracket accommodating a data storage device is usually installed in a rack in an enclosure of an electronic device, such as a computer. Such a bracket, as shown in FIG. 1, for instance, is a cuboid structure. The bracket includes opposite sidewalls 3 and 4 for sandwiching the data storage device therebetween, a fixing plate 2 perpendicularly connected between front ends of the sidewalls 3 and 4, a bottom wall 5 supporting the data storage device, and a top wall 6 covering the data storage device. A rotating member 7 is mounted to the fixing plate 2 for installing the bracket to the computer enclosure. However, due to the bracket having the same appearance, it is not easy to tell whether a data storage device has already been mounted in the bracket or not, thus easily installing the empty bracket by mistake.

DETAILED DESCRIPTION

Figure 1:
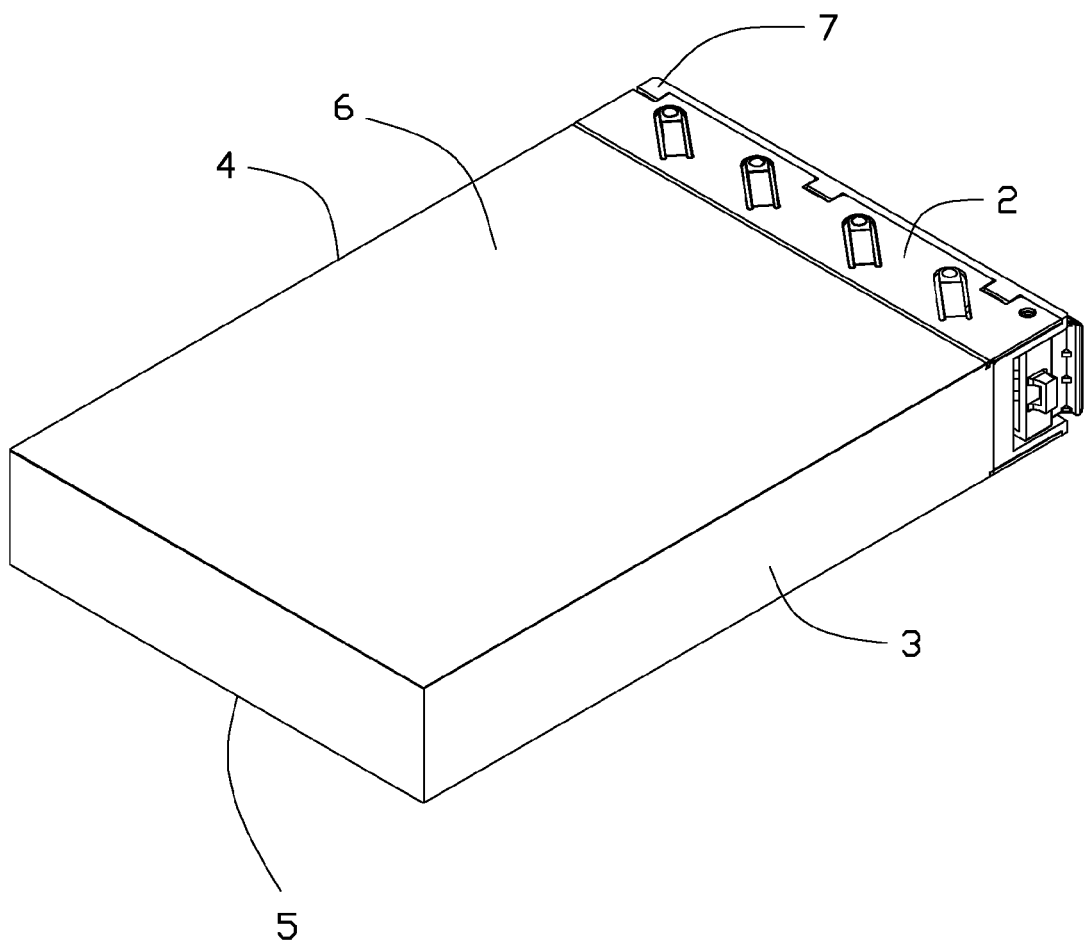
FIG. 1 is an isometric view of a related-art bracket.
Figure 2:
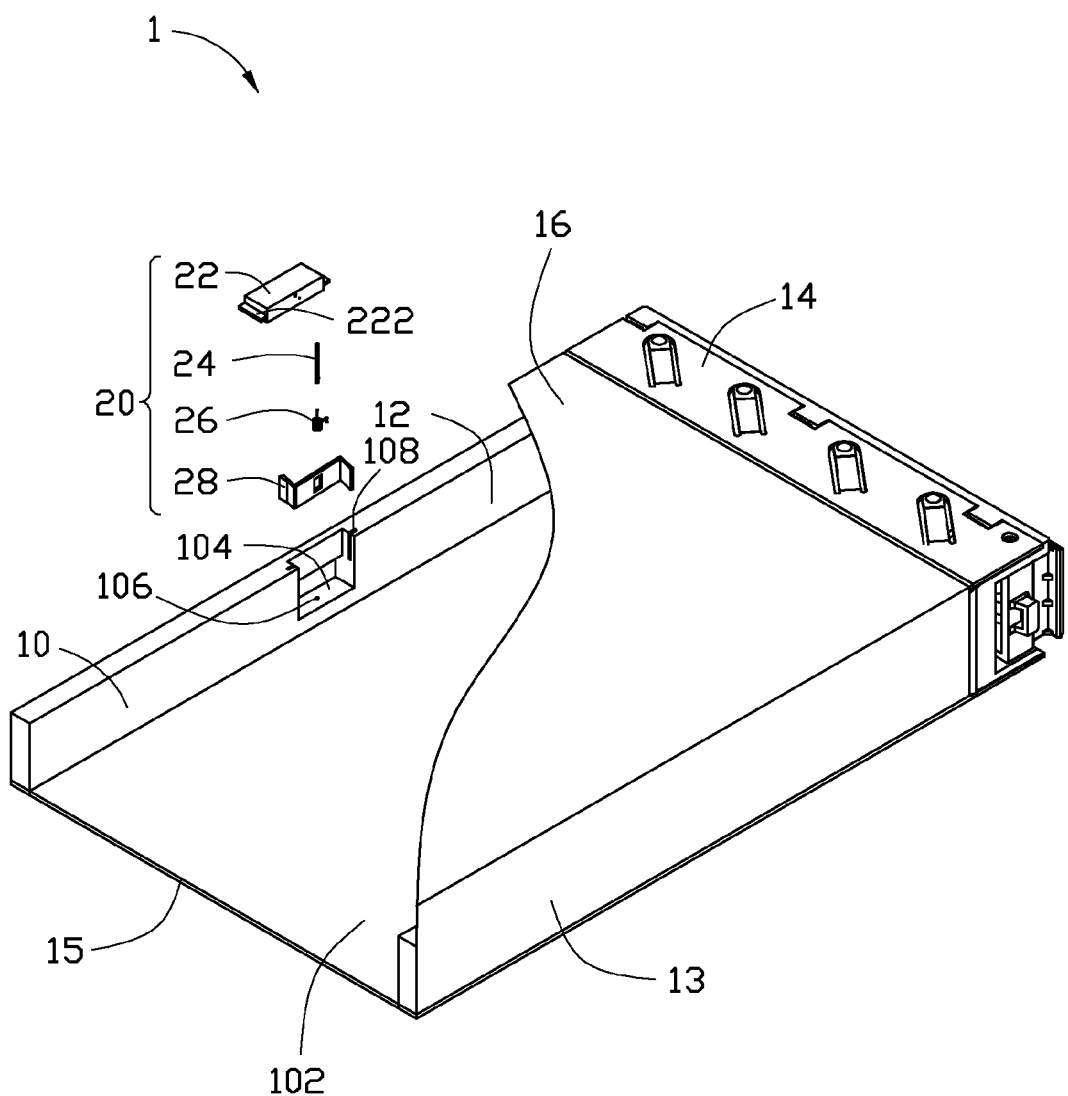
FIG. 2 is an exploded, isometric view of an exemplary embodiment of a mounting apparatus for a data storage device.
Figure 3:
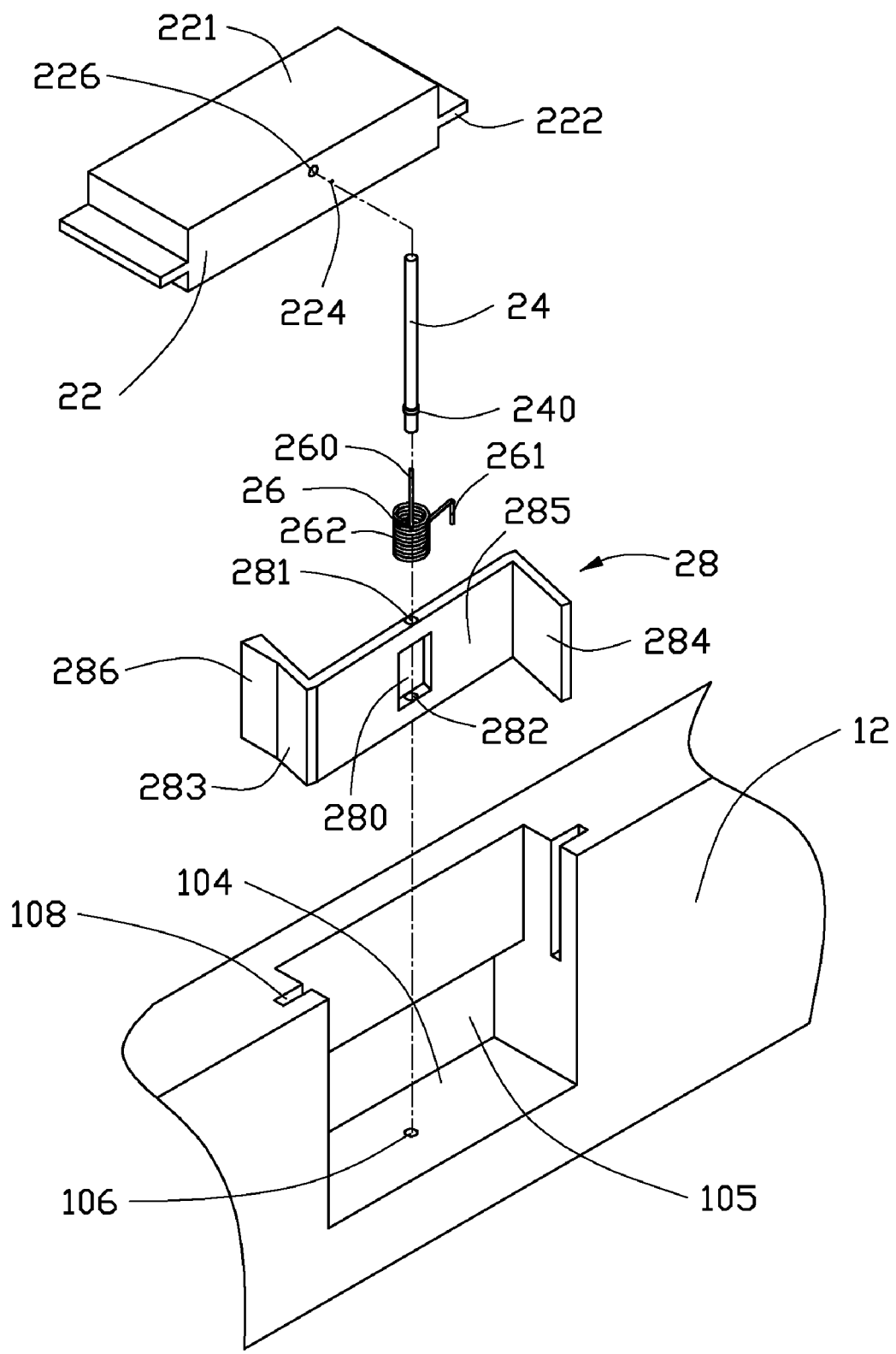
FIG. 3 is a partial, enlarged, isometric view of FIG. 2.
Figure 4:
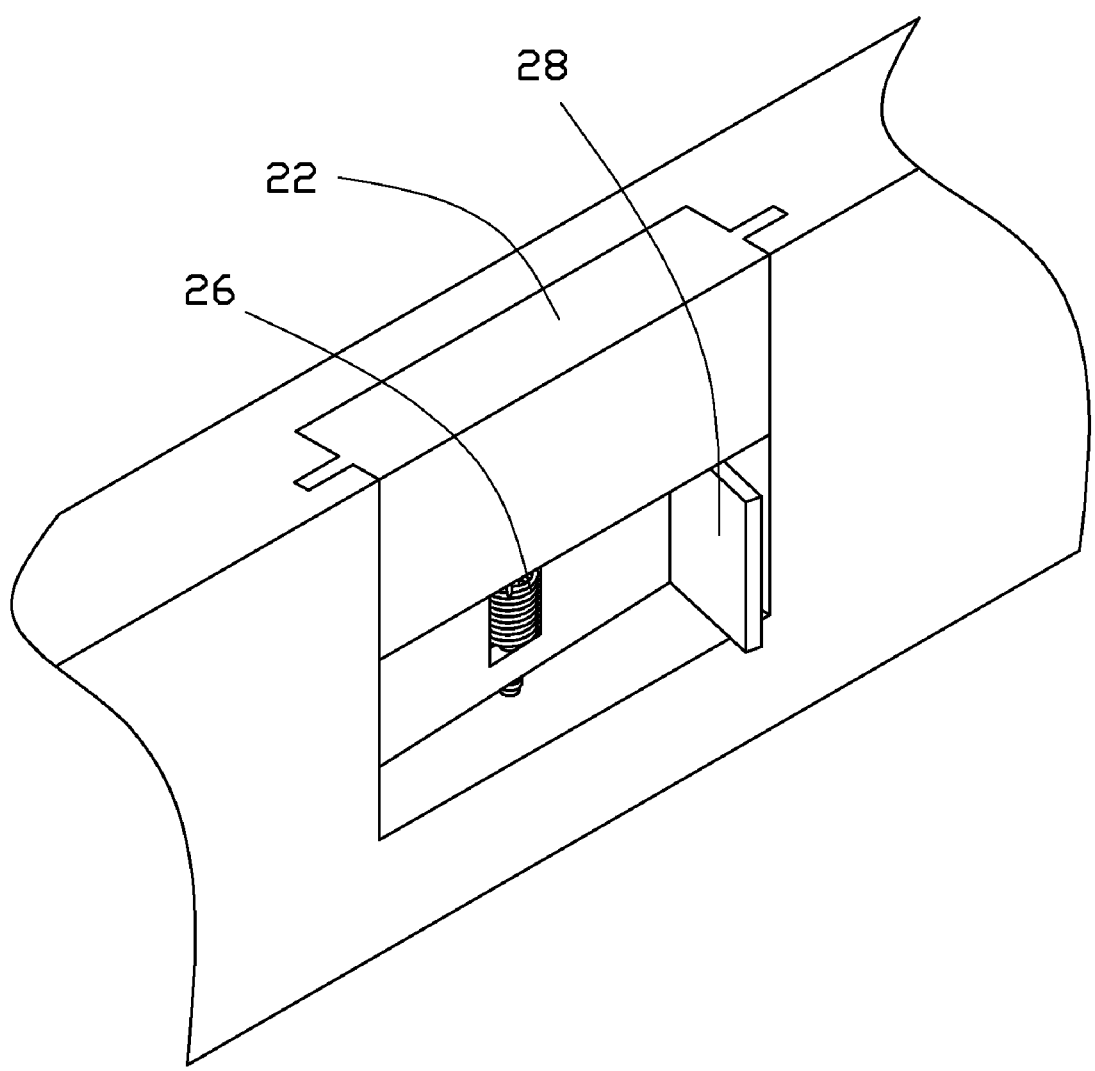
FIG. 4 is an assembled, isometric view of FIG. 3.

Referring to FIGS. 2 to 5, an exemplary embodiment of a mounting apparatus 1 is provided to fix a data storage device 100 to a rack in an enclosure of an electronic device, such as a computer. The mounting apparatus 1 includes a bracket 10 for accommodating the data storage device 100 and a latching member 20.

The bracket 10 includes opposite sidewalls 12 and 13 for sandwiching the data storage device 100 therebetween, a fixing plate 14 perpendicularly connected between front ends of the sidewalls 12 and 13, a bottom wall 15 perpendicularly connected between bottoms of the sidewalls 12 and 13, and a top wall 16 perpendicularly connected between tops of the sidewalls 12 and 13. The sidewalls 12 and 13, the bottom wall 15, and the top wall 16 together form a receiving space 102 for accommodating the data storage device 100.

A receiving slot 104 is defined in a middle portion of an inner side of the sidewall 12, the receiving slot 104 extending through an outer side of the sidewall 12 to define an opening 105. A pivot hole 106 is defined in a bottom bounding the opening 105. A recess 108 is defined in each of opposite sides bounding the receiving slot 104, extending through a top of the sidewall 12.

The latching member 20 includes an elastic member, such as a torsion spring 26, a block tab 22, a pivot shaft 24, and a "Z"-shaped baffle 28.

The block tab 22 includes a rectangular main body 221, and two block portions 222 extending from opposite ends of the main body 221 for being received in the recesses 108 of the sidewall 12. Two mounting holes 224 and 226 are defined in a sidewall of the block tab 22.

A circular protrusion 240 protrudes from a circumference of the pivot shaft 24, near a bottom end of the pivot shaft 24.

The torsion spring 26 includes a coil portion 262. A first extension arm 260 and a second extension arm 261 extend from opposite ends of the coil portion 262, respectively. The first extension arm 260 and the second extension arm 261 extend perpendicular to an axis of the coil portion 262 and then bend parallel to the axis of the coil portion 262.

The baffle 28 includes a side panel 285 and two extension portions 283 and 284 perpendicularly and reversely extending from the side panel 285. A groove 280 is defined in a middle of the baffle 28 for receiving the coil portion 262 of the torsion spring 26. Two through holes 281 and 282 are defined in a top and a bottom of the side panel 285 respectively, communicating with the groove 280, for the pivot shaft 24 passing through. A slanting end 286 is formed on the baffle 28 at the extension portion 283, opposite to the side panel 285.

Figure 5:
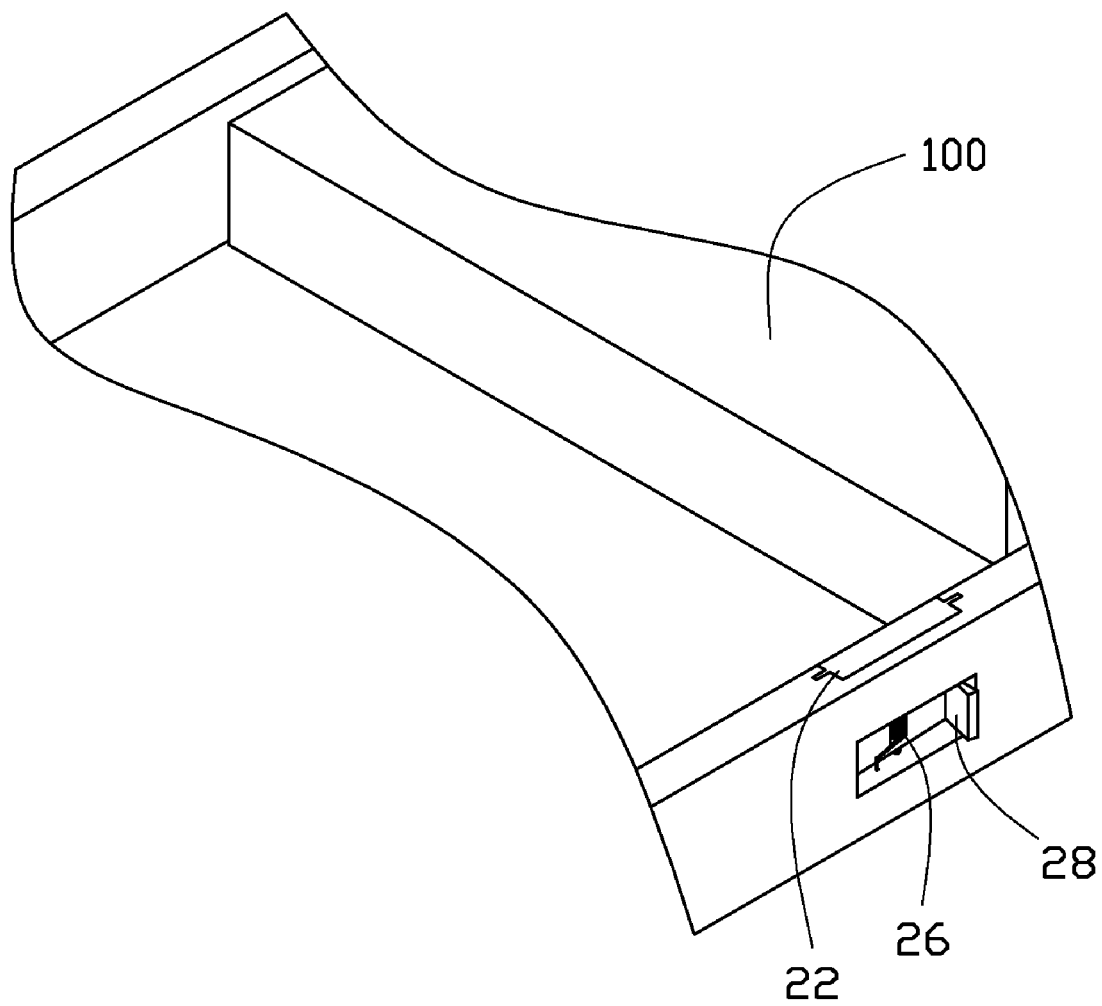
FIG. 5 is similar to FIG. 4, but viewed from another perspective.

In assembly, the coil portion 262 of the torsion spring 26 is received in the groove 280 of the baffle 28. The baffle 262 and the torsion spring 26 are received in the receiving slot 104 of the sidewall 12. The pivot shaft 24 extends through the through hole 281, the coil portion 282 of the torsion spring 26, and the through hole 282, to engage in the pivot hole 106. The second extension arm 261 of the torsion spring 26 resists against the bottom of the receiving slot 104, and the protrusion 240 of the pivot shaft 24 located between the bottom of the receiving slot 104 and the baffle 28. A top of the pivot shaft 24 and the first extension arm 260 of the torsion spring 26 are inserted into the mounting holes 226 and 224 of the block tab 22, respectively, and the first extension arm 260 of the torsion spring 26 resists against the block tab 22. The block portions 222 of the block tab 22 are received in the recesses 108 of the sidewall 12, with a top end of the side panel 285 of the baffle 28 resisting against the block tab 22. The second extension arm 261 of the torsion spring 26 is located at a first position of the bottom of the receiving slot 104, where the extension portion 283 of the baffle 28 extends into the receiving space 102, and the extension portion 284 of the baffle 28 extends out of the sidewall 12 (as shown in FIG. 5) under torque of the torsion spring 26, to prevent the bracket 10 without data storage device 100 from being placed in the electronic device.

Figure 6:
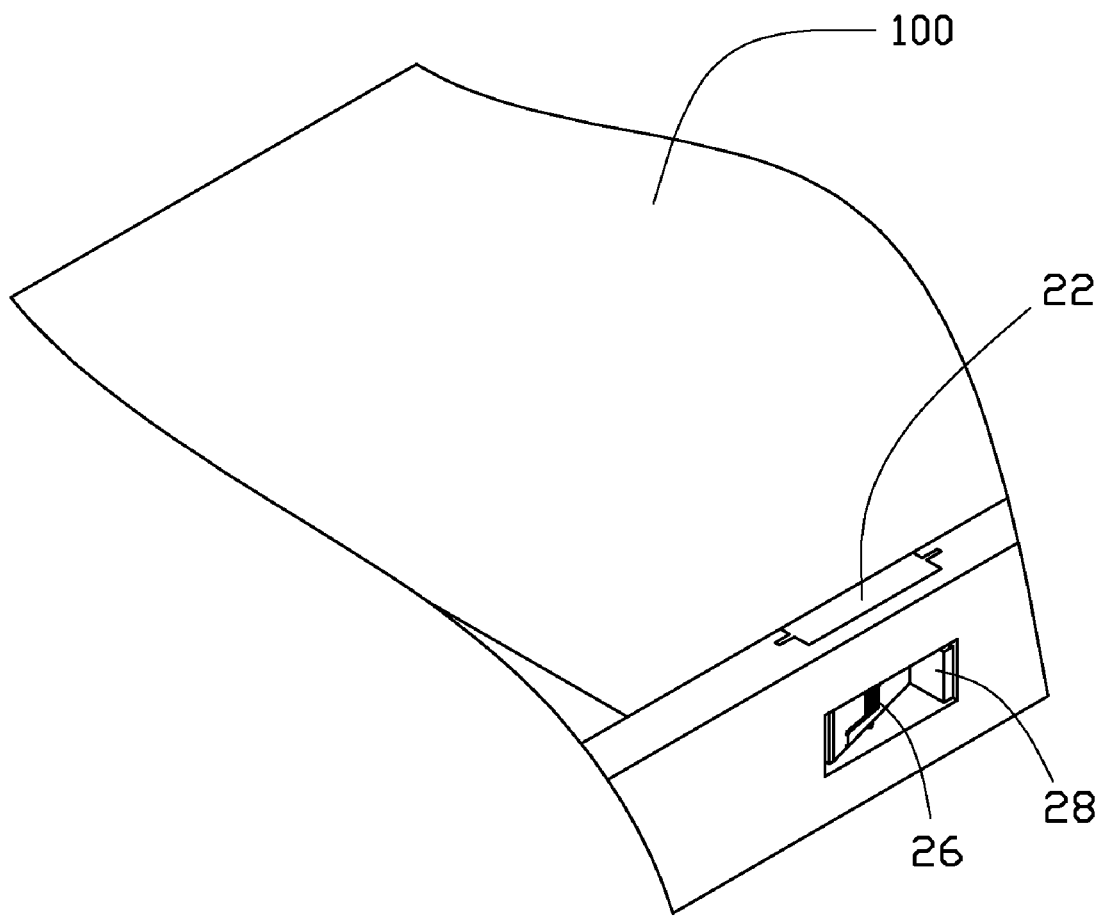
FIG. 6 is similar to FIG. 5, but showing a data storage device mounted to the mounting apparatus.

Referring to FIG. 6, in use, the data storage device 100 is mounted in the receiving space 102 of the bracket 10, the data storage device 100 drives the extension portion 283 of the baffle 28 to withdraw into the receiving slot 104. The baffle 28 rotates around the pivot shaft 24, the torsion spring 26 is compressed. The second extension arm 261 of the torsion spring 26 is located at a second position of the bottom of the receiving slot 104, where the extension portion 284 of the baffle 28 is received in the receiving slot 104, the baffle 28 is located in the receiving slot 104, and the data storage device 100 is accommodated in the receiving space 102 of the bracket 10. The data mounting apparatus 1 can be fixed to the rack in the enclosure of the electronic device.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A mounting apparatus for a data storage device, the apparatus comprising:

a bracket to receive the data storage device, the bracket comprising a sidewall, the sidewall defining a receiving slot facing the data storage device, a bottom bounding the receiving slot defining a pivot hole, opposite sides bounding the receiving slot each defining a recess; and a latching member comprising a baffle received in the receiving slot and supported on the bottom of the receiving slot, an elastic member received in the baffle, a block tab located on the baffle opposite to the bottom of the receiving slot and opposite ends of the block tab engaged in the recesses, and a pivot shaft passing through the baffle, the elastic member, to engage in the block tab and the pivot hole with opposite ends of the pivot shaft, wherein a first end of the elastic member resists against the sidewall in the receiving slot, a second end of the elastic member resists against the block tab; and wherein when the data storage device is not mounted in the bracket, a first end of the baffle extends into the bracket, a second end of the baffle extends out of the bracket under elasticity of the elastic member, wherein when the data storage device is mounted in the bracket, the data storage device drives the baffle to rotate, thereby the first and second ends of the baffle withdraw into the receiving slot of the sidewall.

2. The apparatus of claim 1, wherein the block tab comprises a main body, and two block portions extending from opposite ends of the main body to engage in the recesses of the sidewall, and two mounting holes are defined in a sidewall of the block tab for receiving the pivot shaft and the second end of the elastic member.

3. The apparatus of claim 2, wherein the elastic member is a torsion spring.

4. The apparatus of claim 2, wherein the baffle comprises a side panel and two extension portions perpendicularly and reversely extending from opposite ends of the side panel, one of the extension portions extends towards the bracket, the other extension portion extends towards outside of the bracket, a groove is defined in a middle portion of the baffle for receiving the torsion spring, two through holes are defined in a top and a bottom of the side panel, communicating with the groove, for the pivot shaft passing through.

5. The apparatus of claim 4, wherein a protrusion protrudes from the pivot shaft, near a bottom end of the pivot shaft, located between the bottom bounding the receiving slot and the baffle.

6. The apparatus of claim 4, wherein a slanting end is formed on the baffle at a distal end of the extension portion extending towards the bracket.

7. The apparatus of claim 1, wherein an opening is defined in the sidewall communicating with the receiving slot, when the data storage device is not mounted in the bracket, the corresponding end of the baffle extends into the bracket through the opening.

* * * * *